J. HOWELL & D. BIRDSALL.
METHOD OF SECURING TUBES IN STEAM BOILERS, &c.
No. 41,380. Patented Jan. 26, 1864.
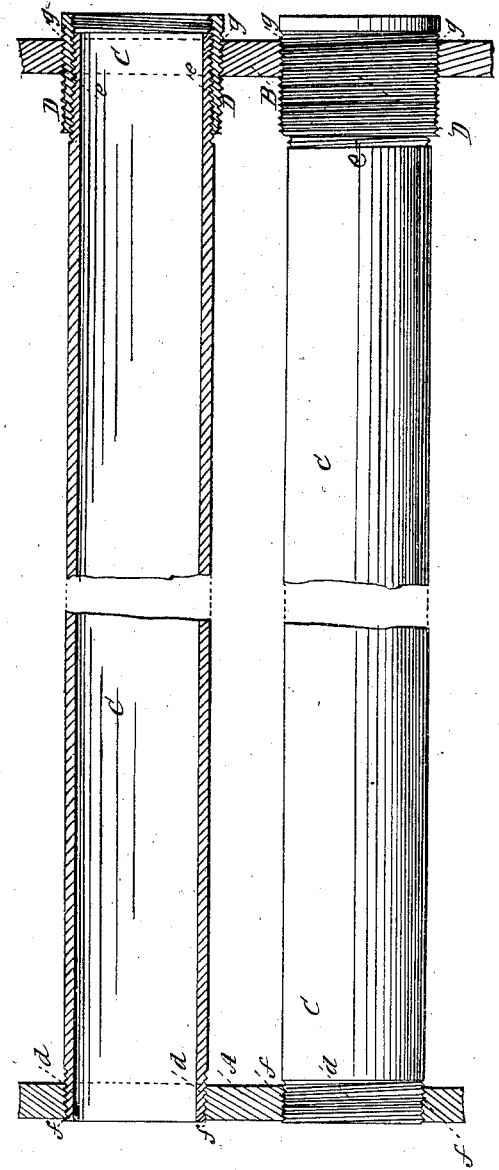

UNITED STATES PATENT OFFICE.

JAMES HOWELL AND DAVID BIRDSALL, OF JERSEY CITY, NEW JERSEY.

IMPROVED METHOD OF SECURING TUBES IN STEAM-BOILERS, &c.

Specification forming part of Letters Patent No. 41,380, dated January 26, 1864.

*To all whom it may concern:*

Be it known that we, JAMES HOWELL and DAVID BIRDSALL, both of Jersey City, in the county of Hudson and State of New Jersey, have invented a new and Improved Mode of Securing Tubes in Steam-Boilers and other Apparatus; and we do hereby declare that the following is a full, clear, and exact description of the same, reference being had to the accompanying drawing, making a part of this specification, said drawing representing a longitudinal view of two tubes and section of the two tube-sheets of a boiler, one of the tubes being in section.

The object of this invention is to apply the tubes in the two tube-sheets of a boiler, heater, condenser, or other apparatus so as to make very tight joints and to provide for their easy removal when necessary to repair or renew them. The tubes are screwed into tapped holes in the two tube-sheets, the holes in one sheet being larger than those of the other, and the corresponding ends of the tubes are enlarged, to fill the larger holes, by means of taper thimbles, which screw onto the tubes and into the latter holes, and it is in the enlargement of the tubes at one end that our invention consists.

To enable others skilled in the art to apply our invention to use, we will proceed to describe its construction and operation.

A and B are the two tube-sheets, and C C are the tubes, made long enough to extend through both tube-sheets. The tubes are of uniform diameter, except for a short distance from their ends, which are tapered, and have taper screw-threads $d$ and $e$, cut upon them, the threads $d$ at one end being only long enough to enable them to screw into taper-tapped holes $f$ in the tube-sheet A, and the threads $e$, at the other end, being considerably longer, extending, say, from one inch to one inch and a half from the extremity. The holes $g$ in the tube-sheet B are larger than the tubes—say, from one-eighth to three-sixteenths of an inch—all round, and taper inward or in an opposite direction to the taper on the corresponding ends of the tubes, and in the same direction and degree as the taper of the opposite ends of the tubes and of the holes $f$ in the tube-sheet A.

D D are the thimbles, which are screwed into the holes $g$ in the tube-sheet B, from the outside of the said sheet, and at the same time screwed on the threads $e$ on the corresponding ends of the tubes. These thimbles are tapered inside and out in opposite directions, but in corresponding degrees, the outside taper corresponding with the taper of the holes $g$ $g$, and the inside taper corresponding with that of the threaded portions $e$ of the tubes, and the screw-threads on the interior and exterior of the said thimbles correspond in pitch.

The tubes are inserted through the tube-sheet B from the exterior thereof, and screwed into the tube-sheet A from the interior, and when screwed up as tight as possible into the holes $f$ of the latter tube sheet the thimbles D are introduced from the exterior of the tube-sheet B, to fill the spaces between the threads $e$ of the tubes and the holes $g$, and screwed into the said holes and onto the tubes until they form tight joints both in the said holes and around the tubes. Red lead or other cement may be applied to the several screw-threads to assist in making the several joints perfectly tight. The said thimbles D may be considered as forming an enlargement of the several tubes.

What we claim as our invention, and desire to secure by Letters Patent, is—

1. The combination of the enlargements at one end of the tubes and corresponding enlarged holes in one tube-sheet, substantially as herein specified.

2. The internally and externally tapered screwed thimbles D, applied in combination with the taper screw-threads $e$ on the tubes and taper-tapped holes $g$ in the tube-sheet B, substantially as herein described.

JAMES HOWELL.
DAVID BIRDSALL.

Witnesses:
D. ROBERTSON,
THOS. S. J. DOUGLAS.